United States Patent [19]

Fischer

[11] 4,070,842

[45] Jan. 31, 1978

[54] METHOD AND ARRANGEMENT FOR ORIENTING OBJECTS ON SUPPORT STRUCTURES

[76] Inventor: Artur Fischer, Weinhalde 34, D-7244 Tumlingen, Waldachtal 3, Germany

[21] Appl. No.: 723,646

[22] Filed: Sept. 15, 1976

[30] Foreign Application Priority Data

Sept. 26, 1975 Germany .................... 2542971

[51] Int. Cl.² .............................................. E04B 2/30
[52] U.S. Cl. ...................................... 52/508; 52/704; 52/741
[58] Field of Search ............................... 52/704–710, 52/617, 743, 378, 506, 508; 248/19

[56] References Cited

U.S. PATENT DOCUMENTS

| | | | |
|---|---|---|---|
| 3,204,416 | 9/1965 | Williams | 61/45 B |
| 3,379,019 | 4/1968 | Williams | 61/45 B |
| 3,434,261 | 3/1969 | Rohe | 52/708 |
| 3,662,805 | 5/1972 | Sygnator | 52/617 |
| 3,977,333 | 8/1976 | Phillips | 248/23 |

Primary Examiner—John E. Murtagh
Attorney, Agent, or Firm—Michael J. Striker

[57] ABSTRACT

A method and arrangement for orienting objects on support structures formed with an anchoring hole utilizes an elongated element, a fixing member and a plate member. The fixing member is fixedly mounted on the hole of the support structure. The elongated element is inserted through the passage with clearance so that leading and trailing portions of the element are respective located within and outside of the hole. An object is mounted on the trailing portion of the element. The plate member is juxtaposed over the fixing member and is connected to the elongated element. Movement of the plate member relative to the fixing member caused by displacement of the elongated element in the clearance results in orientation of the object which is mounted on the element to any of a plurality of positions relative to the support. After one of these positions have been selected, the leading portion of the element is anchored in the hole.

13 Claims, 2 Drawing Figures

METHOD AND ARRANGEMENT FOR ORIENTING OBJECTS ON SUPPORT STRUCTURES

BACKGROUND OF THE INVENTION

The present invention relates generally to a method and arrangement for positioning objects relative to support structures and, more particularly, to arranging cladding panels to assume a desired orientation relative to masonry walls.

It is known in the art of supporting objects on support structures to inject a cement mixture into a hole formed in the structure so as to anchor a fastening element which has been inserted into the hole. Such processes have proven unsatisfactory for wall mountings and even more so for ceiling mountings, because the flowable cement escapes from the hole before it has set. Although no cement flows out of the hole in the case of floor mountings, such processes have also proven disadvantageous due to the fact that the fastening elements will, due to their own weight, sink into the still-soft cement mixture.

To secure the position of the movable fastening element, it is therefore necessary in the case of the known processes to hold the fastening element until the cement has cured. This entails a considerable loss of time and money. For this reason, the cementing-in of such fastening elements is only performed on a mass-production basis, e.g. in the manufacture of prefabricated concrete articles. In this case the position of the many fastening elements is secured by auxiliary holding devices mounted on bores until the concrete has permanently set.

In order to avoid the above-mentioned disadvantages of the art, it has also been proposed to use a ring member to fix the fastening element in the hole. The binder is injected into the hole through a filling orifice which is provided either in the fastening element or in the ring member. However, this known process does not provide for any adjustment of the position of the object relative to the support, neither before nor during the time in which the cement is setting.

SUMMARY OF THE INVENTION

Accordingly it is an object of the present invention to overcome the disadvantages of the prior art.

Another object of the present invention is to provide an anchoring arrangement which is suitable for floor, wall and ceiling mountings.

A further object of the invention is to adjust the position of the object relative to the support either before or during the time in which the cement is setting.

In keeping with these objects and others which will become apparent hereinafter, one feature of the invention, briefly stated, is embodied in arranging an object on a support formed with an anchoring hole by utilizing a fixing member having a passage, an elongated element and a plate member. The invention includes fixedly mounting the fixing member in the hole, inserting the elongated element through the passage with clearance so that leading and trailing portions of the element are respectively located within and outside of the hole, and mounting an object on the trailing portion of the element. The platen member is thereupon juxtaposed over the fixing member and is connected to the elongated element. Movement of the plate member relative to the fixing member caused by displacing the elongated element in the clearance results in the orientation of the object mounted on the element to any of a plurality of positions relative to the support. The leading portion of the element is anchored in the hole at any one of these positions.

The capability of being able to adjust the relative position between the object and the support overcomes the prior-art drawback of having a fixed mounting. This is very desirable when cladding panels are desired to be anchored adjacent each other on floor, wall or ceiling mountings. After the adjustment has taken place, the plate member is firmly secured onto the fixing member in the selected position.

In accordance with the invention anchoring of the elongated element is achieved by injecting a hardenable substance through a filling orifice provided in the plate member. This hardenable substance will not flow out of the hole and is therefore especially well-suited for use in wall and ceiling mountings by virtue of the fact that the hole mouth is plugged up by the fixing member and the additional fact that the mouth of the passage formed within the fixing member is covered by the plate member. Therefore it is no longer necessary to hold the fastening element by auxiliary devices until the binder of the hardenable substance has cured and set.

The adjustment of the relative position between the object and the support may be performed at any time prior to the complete setting of the hardenable substance. Thus successive adjustments in the position of the object may be executed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
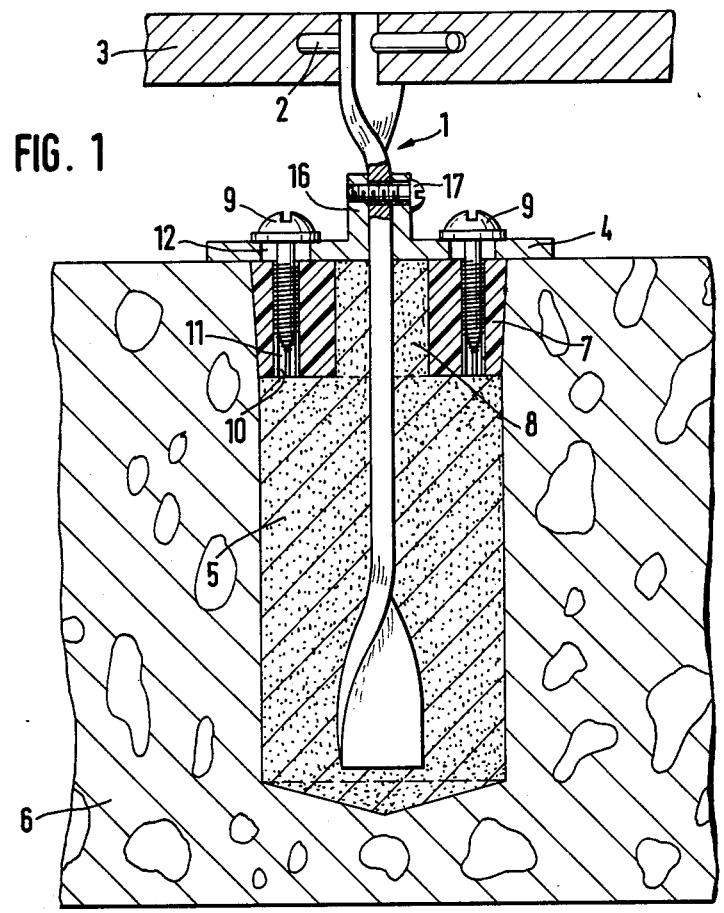
FIG. 1 is a partial cross-sectional view of the anchoring arrangement and method according to the invention.

Disclosing jointly the method and arrangement for orienting objects on a support structure with reference to FIG. 1 of the drawing, it will be seen that reference numeral 1 generally identifies an elongated, generally rod-shaped, fastening element of rectangular cross-section having a leading anchoring portion which is insertable into the hole 5 formed in the support structure 6 for anchoring therein, and a trailing carrying portion outside the hole 5 which is operative for supporting an object 3 at a distance from the support structure 6. The leading portion is twisted through approximately 90° so as to increase the anchorage effect; the trailing portion is also twisted through approximately 90° and has a transverse peg 2 for fixing the object 3 such as a cladding panel onto the element 1. The support is preferably a low-strength structure such as masonry.

Fixing member 7 is comprised of slightly resilient material, preferably synthetic plastic material, and has a conical configuration. Fixing member 7 is wedged into the mouth of hole 5 so that a surface of the fixing member faces outwardly of the hole. A passage 8 extends through the fixing member 7 and communicates with the hole 5.

A plate member 4 is connected to the trailing portion of the element 1 and is juxtaposed over the outer surface of the fixing member 7 when the element 1 is inserted into passage 8. The element 1 is received with clearance in passage 8 by virtue of the fact that the cross-sectional diameter of the passage 8 is relatively greater than the cross-sectional diameter of the element 1.

In order to properly orient the object 3 relative to support 6, the cover member 4 engages the outer surface of fixing member 7 in sliding relationship. Displacing the cover member 4 relative to the stationary fixing member 7 results in the movement of the elongated element 1 in the clearance of the passage 8, thus the object 3 which is supported on the element 1 is displaceable to any desired orientation relative to the support 6.

In order to have the capability of securing the plate 4 in a selected position relative to fixing member 7, first engaging elements or longitudinal bores 11 are formed in fixing member 7, second engaging elements or screws 9 are provided for threadedly engaging the bores 11, and slots 12 are formed in cover plate 4 for the screws to pass through. To strengthen the threaded connection, longitudinally-extending ribs 10 are provided in bores 11. Of course it is also possible to provide the fixing member 7 with threaded pins which project outwardly away from the support and to securely fix the cover plate 4 in position by using cooperating threaded nuts instead of the previously-described screws 9.

Figure 2:
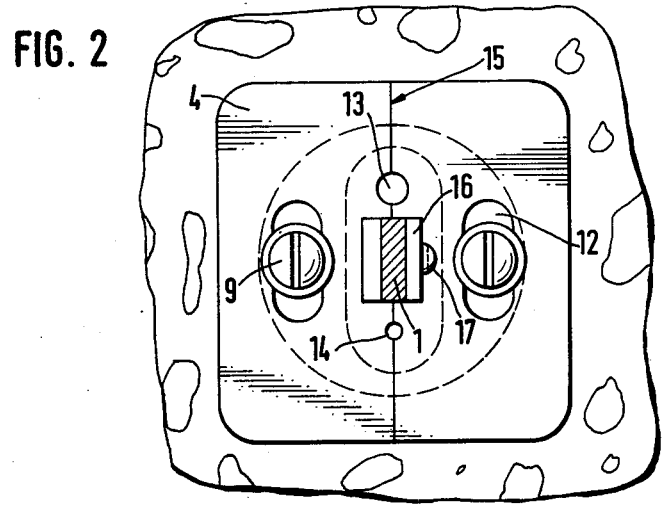
FIG. 2 is a partial top plan view of the arrangement of FIG. 1.

In order to vary the position of the cover plate 4 with respect to the fixing member 7, the slots 12 are elongated as shown in FIG. 2. By loosening and subsequently tightening of the screws 9, an adjustable locking arrangement is obtained.

After the desired position has been determined for object 3, a tubular nozzle of an injection device is inserted into filling orifice 13. Such an injection device is conventional in the art and is generally operative for injecting under pressure a hardenable substance, such as cement or any analogous settable substance.

The filling orifice 13 is formed in plate 4 in the region of the outer opening of the passage 8 so that the substance will flow through the passage 8 and from there to the exterior of the leading portion of element 1. During the filling or partial filling of hole 5, the displaced air is vented through venting orifice 14 whicn is also formed in the plate 4. Both orifices 13 and 14 are so located on plate 4 that they will not be blocked by outer wall portions of fixing member 7 in all positions of the movable plate 4.

In order to permit subsequent securement of the plate 4 about the fastening element 1, the cover plate is comprised of two separate parts. These two parts are each formed with a flange portion 16 which face each other and which engage opposite sides of the element 1 in the region of the boundary line 15. The mutually facing flanges 16 are fixed to the fastening element 1 either by spot welding or, in accordance with the embodiment shown, by means of screw 17.

It will be understood that each of the elements described above, or two or more together, may also find a useful application in other types of constructions differing from the types described above.

While the invention has been illustrated and described as embodied in a method and arrangement for orienting objects on support structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Arrangement for anchoring objects at a distance relative to a support formed with an anchoring hole, comprising an elongated element having a leading anchoring portion insertable with clearance into the hole for anchoring therein, and a trailing carrying portion outside the hole for supporting an object at a distance from the support; a fixing member fixedly mountable in the hole and having a surface which faces outwardly of the hole, said fixing member including an elongated passage through which said elongated element also passes with clearance; a plate member overlying said surface of said fixing member and being connected to said trailing portion of said elongated element; and adjusting means for moving said elongated element relative to both said passage and the anchoring hole between any of a plurality of positions relative to said fixing member, including a slot in said plate member and extending generally transversely of the direction of insertion of said elongated element into the hole, and locking means in said slot for arresting said plate member against movement relative to said fixing member to thereby secure said elongated element in a selected one of said positions, whereby the object supported on said elongated element is movable relative to the support in dependence upon movement of said elongated element.

2. An arrangement as defined in claim 1; and further comprising means for anchoring said leading portion in the hole by forming a plug of hardenable substance about a part of said leading portion, said anchoring means comprising a filling orifice located on said plate member and communicating with said passage.

3. An arrangement as defined in claim 2, wherein said anchoring means further comprises a venting orifice located on said plate member and communicating with said passage, said venting orifice being spaced from said filling orifice.

4. An arrangement as defined in claim 1, wherein said plate member has another elongated slot.

5. An arrangement as defined in claim 1, wherein said fixing member has threaded bores first engaging elements for respectively threadedly engaging said locking means.

6. An arrangement as defined in claim 5, wherein said first engaging elements are threaded bores and wherein said second engaging elements are screws, and wherein each of said screws extend through respective ones of said slots.

7. An arrangement as defined in claim 6, wherein said screws are receivable into said elongated slots with clearance so that said plate member has freedom of relative movement with respect to said fixing member when said screws are turned in requisite direction.

8. An arrangement as defined in claim 1, wherein said plate member is comprised of two parts, each part having mating flanges which face each other.

9. Arrangement for anchoring objects to a support formed with an anchoring hole, comprising an elongated element having a leading anchoring portion insertable into the hole for anchoring therein, and a trailing carrying portion outside the hole for supporting an object at a distance from the support; a fixing member having a surface and being fixedly mountable in the hole so that said surface faces outwardly of the hole, said fixing member including a passage through which said elongated element passes with clearance and having first engaging elements; a plate member overlying said surface of said fixing member, said plate member being connected to said trailing portion of said elongted element and having a pair of elongated slots; means for positioning said plate member relative to said fixing member by moving said elongated element in said clearance to thereby orient the object supported on said elongated element relative to the support; and second engaging elements for respectively threadedly engaging said first engaging elements.

10. Arrangement for anchoring objects to a support formed with an anchoring hole, comprising an elongated element having a leading anchoring portion insertable into the hole for anchoring therein, and a trailing carrying portion outside the hole for supporting an object at a distance from the support; a fixing member having a surface and being fixedly mountable in the hole so that said surface faces outwardly of the hole, said fixing member including a passage through which said elongated element passes with clearance; a plate member overlying said surface of said fixing member, said plate member being connected to said trailing portion of said elongated element and being comprised of two parts, each part having mating flanges which face each other; and means for positioning said plate member relative to said fixing member by moving said elongated element in said clearance to thereby orient the object supported on said elongated element relative to the support.

11. A method of arranging an object at a distance relative to a support formed with an anchoring hole utilizing a fixing member having a passage, an elongated element and a plate member, the method comprising the steps of fixedly mounting the fixing member in the hole; inserting the elongated element through the passage with clearance so that leading and trailing portions of the element are respectively located within and outside of the hole; mounting an object on the trailing portion of the element; juxtaposing the plate member over the fixing member and connecting the plate member to the elongated element; moving the elongated element relative to the passage and the hole between any of a plurality of positions relative to the fixing member to thereby move the object mounted on the element relative to the support in dependence upon such movement of the elongated element; and anchoring the leading portion in the hole at a selected one of said positions to thereby fix the object at a predetermined orientation relative to the support.

12. A method as defined in claim 11, wherein said step of anchoring includes providing a filling orifice which communicates with the passage on the plate member, and injecting a hardenable substance through said orifice so as to surround the exterior of the leading portion of the element.

13. An arrangement as defined in claim 1, wherein said fixing member is annular and is constituted by resilient synthetic plastic material; and wherein said elongated element has a cross-section which is relatively smaller than the transverse dimension of said passage.

* * * * *